United States Patent
Persson et al.

(10) Patent No.: US 6,482,508 B1
(45) Date of Patent: Nov. 19, 2002

(54) LOAD-CARRYING VEHICLE STRUCTURE OF COMPOSITE MATERIAL AND METHOD FOR ITS MOULDING

(75) Inventors: Arne Persson, Leverhultsvägen; Åke Nylinder, Norra Grinnekärrsvägen, both of (SE)

(73) Assignee: AB Volvo, Gothenburg (SE)

( * ) Notice: Subject to any disclaimer, the term of this patent is extended or adjusted under 35 U.S.C. 154(b) by 0 days.

(21) Appl. No.: 09/508,845

(22) PCT Filed: Sep. 16, 1998

(86) PCT No.: PCT/SE98/01659

§ 371 (c)(1), (2), (4) Date: May 17, 2000

(87) PCT Pub. No.: WO99/16660

PCT Pub. Date: Apr. 8, 1999

(30) Foreign Application Priority Data

Sep. 17, 1997 (SE) .............................................. 9703343

(51) Int. Cl.⁷ ................................................. B23B 3/26
(52) U.S. Cl. .................................. 428/304.4; 428/313.5
(58) Field of Search ........................... 428/313.5–317.9, 428/141, 304.4; 442/370, 221

(56) References Cited

U.S. PATENT DOCUMENTS

| | | | |
|---|---|---|---|
| 5,009,821 A | * | 4/1991 | Weaver |
| 5,283,028 A | | 2/1994 | Breezer et al. |
| 5,424,021 A | * | 6/1995 | Nakade et al. |
| 5,725,940 A | * | 3/1998 | Sakai et al. |
| 5,776,399 A | * | 7/1998 | Swenson |
| 5,780,129 A | * | 7/1998 | Ohta |
| 5,888,616 A | * | 3/1999 | Ang |

FOREIGN PATENT DOCUMENTS

| | | |
|---|---|---|
| FR | 2686043 | 7/1993 |
| GB | 2078628 | 1/1982 |

* cited by examiner

Primary Examiner—Tom Dunn
Assistant Examiner—Jonathan Johnson
(74) Attorney, Agent, or Firm—Samuels, Gauthier & Stevens, LLP

(57) ABSTRACT

The invention relates to a load-bearing vehicle structure of composite material, and a method for moulding such a load-bearing vehicle structure. The invention concerns the fields of fiber-reinforced thermoplastic composites, sandwich structures and compression moulding. The load-bearing vehicle structure (1) according to the invention comprises first (2) and second (3) surface materials with reinforcement fibers and one or several intermediate pieces of core material (4, 5, 6, 7) which are arranged in pattern adapted to a load-bearing material structure, and is characterized in that the surface materials and/or the core material comprise(s) thermoplastic material, and that the first surface material is attached by means of thermal bonds to first faces of the piece or pieces of core material and that the second surface material is attached by means of thermal bonds to second, opposing faces of the piece or pieces of core material. Load-bearing vehicle structures according to the invention can be utilized within the field of vehicle components with low weight and high stiffness and load-bearing ability, for example floor structures in motor vehicles.

12 Claims, 2 Drawing Sheets

LOAD-CARRYING VEHICLE STRUCTURE OF COMPOSITE MATERIAL AND METHOD FOR ITS MOULDING

This application is a 371 of PCT/SE 98/01659, filed Sep. 16, 1998.

TECHNICAL FIELD

The present invention relates to a load-bearing vehicle structure of composite material, and a method for moulding such a load-bearing vehicle structure.

The invention concerns the fields of fibre-reinforced thermoplastic composites, sandwich structures, and compression moulding.

The present invention is applicable within the field of vehicle components with low weight and high stiffness and load-bearing capability, for example in floor structures of motor vehicles.

BACKGROUND OF THE INVENTION

Previously, as a rule, conventional load-bearing vehicle structures, such as for example floor structures in motor vehicles, have been manufactured from different sheet metal constructions.

The increasing demands for vehicles with low weight, aimed at reducing fuel consumption, has resulted in an increased use of different thermosetting plastic composites in load-bearing vehicle structures.

An example of such thermosetting plastic composites is glass fibre reinforced vinyl ester plastic. When manufacturing components of this type, reinforcement material is preformed for example in the form of glass fibre mats and is placed in a collapsible moulding tool in order to be impregnated with thermosetting matrix material therein. When the curing has proceeded far enough, the moulding tool is opened and a component of reinforced thermosetting plastic is removed.

A disadvantage which may be perceived with thermosetting plastic composites is the comparatively long curing time which is necessary when moulding components of thermosetting plastic. Furthermore, in certain cases, it might be difficult to obtain a uniform impregnation of the reinforcement material with matrix material.

SUMMARY OF THE INVENTION

Accordingly, the first object of the present invention is to provide a load-bearing vehicle structure of composite material which eliminates the problems which may be perceived with the thermosetting plastic composites which have previously been utilized in load-bearing vehicle structures for the purpose of reducing the weight of a motor vehicle.

In accordance with claim 1, this first object is achieved by means of the load-bearing vehicle structure according to the invention comprising first and second surface materials with reinforcement fibres, and one or several intermediate pieces of core material which are arranged in a pattern adapted to a load-bearing material structure, and that the surface material and/or the core material thereby comprise(s) thermoplastic material, and that the first surface material is attached by means of thermal bonds to first faces of the piece or pieces of core material and that the second surface material is attached by means of thermal bonds to second, opposing faces of the piece or pieces of core material.

Furthermore, a second object of the present invention is to provide a simple and rapid method for moulding such a load-bearing vehicle structure.

In accordance with claim 9, this second object is achieved by means of the method according to the invention comprising preforming and arranging first and second surface materials and one or several pieces of core material in a pattern which is adapted to a load-bearing material structure in order to provide a material batch, and moulding the material batch using a moulding tool, and that the material batch thereby comprises thermoplastic material which is heated to a temperature above the softening temperature and that the heated material batch is placed between mould parts of the moulding tool in an opened position, whereafter the mould parts are pressed together around the material batch in order to achieve forming and cooling of said material batch to a temperature below said softening temperature, and that the mould parts thereafter are opened and a blank is removed from the moulding tool in order to, after trimming and/or making of holes, provide a load-bearing vehicle structure.

BRIEF DESCRIPTION OF THE DRAWINGS

The invention will be described in the following with reference to the attached drawings, wherein FIG. 1 schematically shows a cross-section of a portion of a load-bearing vehicle structure according to a preferred embodiment of the invention, FIG. 2 schematically and partially in section shows a view seen from above of the load-bearing vehicle structure in FIG. 1, and FIG. 3 schematically shows the most important sub-operations of a preferred embodiment of a method for moulding a load-bearing vehicle structure according to the invention.

DETAILED DESCRIPTION OF PREFERRED EMBODIMENTS

Figure 1:
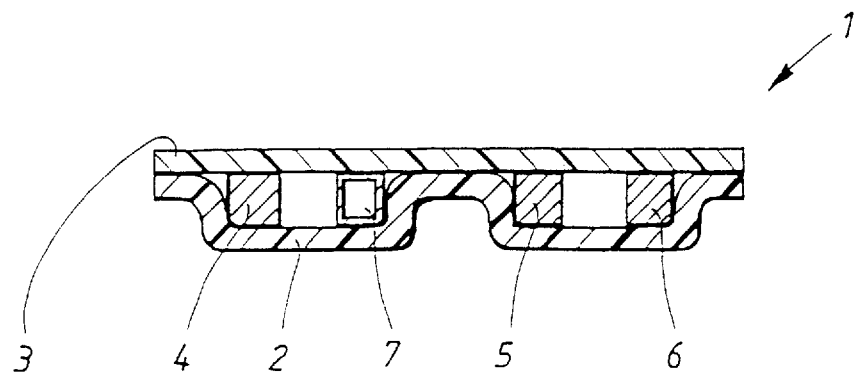
Figure 2:
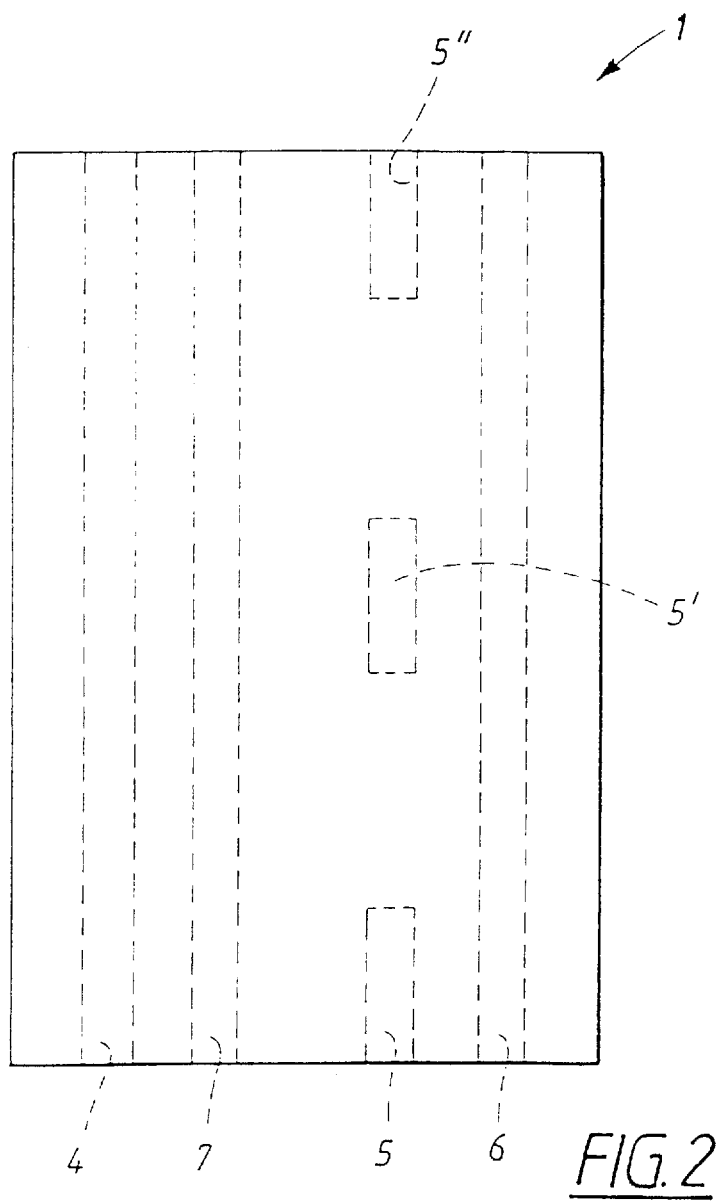

In the following, with reference to the attached FIGS. 1 and 2, a preferred embodiment of a load-bearing vehicle structure according to the invention will be described. In the present case, the load-bearing vehicle structure according to the invention is intended for use as a floor structure in the rear of a passenger car.

The load-bearing vehicle structure 1 comprises a first 2 and a second 3 surface material and a number of intermediate pieces of core material 4, 5, 5', 5", 6, 7. Thus, the two surface materials 2, 3 are attached to opposing surfaces of the pieces of core material by means of thermal bonds.

The materials comprised in the first 2 and second 3 surface materials of the vehicle structure 1 according to the described embodiment consist of a woven textile material of so-called hybrid yarn. In this context, hybrid yarn means that the yarn in the weave comprises both reinforcement fibres and thermoplastic matrix fibres. In the described embodiment, the reinforcement fibres are continuous glass fibres, while the matrix fibres are continuous polypropylene fibres.

Embodiments of the invention in which the reinforcement and/or matrix fibres are provided in the form of cut fibres, or wherein the matrix fibres are replaced with non-fibrous thermoplastic material, are also conceivable. Furthermore, other types of reinforcement fibres than glass fibres, such as carbon fibres, Kevlar fibres, Nomex fibres, or the like, are conceivable.

The matrix material does not necessarily have to comprise polypropylene but can also advantageously be constituted of thermoplastic polyester or another suitable thermoplastic. Also mixtures of different thermoplastics are conceivable.

In the described embodiment, the majority of the pieces of core material 4, 5, 5', 5", 6 consists of structural foam, in this case a porous polyimide foam. The primary task of the core material is to function as a connecting distance element between the two surface materials 2, 3. Embodiments of the invention utilizing other structural foams, for example polyurethane foam, are also conceivable.

Furthermore, the different pieces of core material 4, 5, 5', 5", 6, 7 are arranged in a pattern (indicated with dashed lines in FIG. 2) which, in cooperation with the two surface materials 2, 3, is intended to provide a so-called sandwich construction with high stiffness and load-bearing ability in spite of low weight. The pieces of core material to some extent can thus be said to correspond to beams or stiffening profiles in a conventional load-bearing structure of sheet metal.

In the described embodiment, one of the pieces of core material 7 is constituted of a blow-moulded hollow body of thermoplastic material which has been manufactured by means of a blow-moulding technique, previously known per se. In the described embodiment, the blow-moulded hollow body 7 consists of a polypropylene plastic and is intended to constitute a through-channel in the load-bearing vehicle structure according to the described embodiment. The channel can have a wide range of uses in the application in question. Such a through-channel can, for instance, be used for transportation of ventilating or heating air, as a tubing channel for fuel lines or lines for hydraulic braking fluid, or for laying of wires being part of the electrical system or control system of a motor vehicle.

In addition to these special functions, the blow-moulded hollow body 7 of course also functions as a distance element and a stiffening beam element, in the same way as the remaining pieces of core material 4, 5, 5', 5", 6.

Embodiment of the invention in which all pieces of core material are replaced with one or several thermoplastic hollow bodies, or with other types of thermoplastic bodies, are also conceivable. Such a load-bearing structure can be manufactured to have a weight which is considerably reduced in comparison to the weight of a corresponding structure according to previously known technique.

Figure 3:
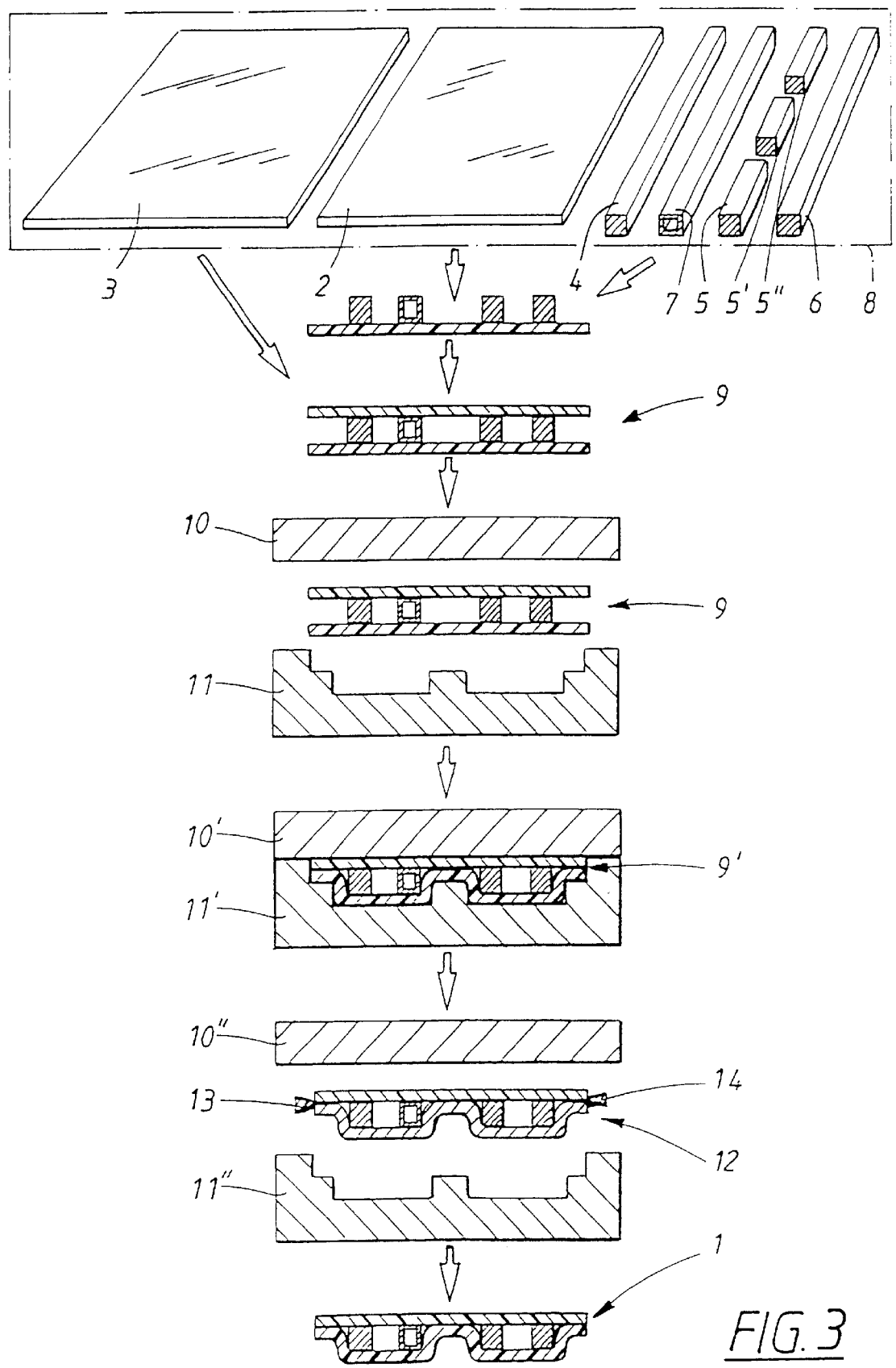

In the following, with reference to the attached FIG. 3, a preferred embodiment of a method for moulding a load-bearing vehicle structure of composite material according to the invention will be described.

In a first step, the method comprises preforming (not shown in FIG. 3) of first 2 and second 3 surface materials and pieces of core material 4, 5, 5', 5", 6, 7.

Preforming refers to cutting-out, cutting or punching of surface material and core material into the desired dimensions, depending on the dimensions and the desired construction of the vehicle structure which is to be manufactured. Thereby, the material shrinkage which might be expected in the continued forming process must also be taken into account.

In this context, preforming might also mean blow moulding of thermoplastic hollow bodies which are intended to function as core material in the load-bearing structure according to the invention.

In the described embodiment, as earlier mentioned, the two surface materials 2, 3 consist of a woven textile material comprising a hybrid yarn with glass fibres as a reinforcement material and polypropylene fibres as a thermoplastic matrix material. To be able to provide both reinforcement material and matrix material in the form of one single material of course results in great practical advantages. However, embodiments of the invention in which the surface materials are constituted of several different layers with different composition are also conceivable.

After the above-mentioned preforming or cutting-out of the different material pieces which are to be included in the load-bearing vehicle structure according to the invention, the first 2 and second 3 surface materials are heated to a temperature which is at least above the softening temperature of the thermoplastic matrix material. In the described embodiment, the surface materials 2, 3 are heated to a temperature of about 180° C. with the aid of a through-air oven (indicated with dashed lines in FIG. 3).

In connection with this, it can be mentioned that the best results when moulding thermoplastic composites are generally obtained if the thermoplastic material is heated to a temperature which exceeds the melting temperature by between 20 and 40° C. In the described embodiment, the preformed pieces of core material 4, 5, 5', 5', 6, 7 are also heated in the same way as the surface materials 2, 3 to about 180° C. However, embodiments of the invention in which only the surface materials or only the core material is heated before the moulding are also conceivable.

Thereafter, the preheated pieces of core material 4, 5, 5', 5", 6', 7 are arranged in a desired pattern on top of the equally heated first surface material 2. The pattern is thereby adapted to, amongst other things, the mechanical stresses which the finished load-bearing vehicle structure has to be able to resist and with knowledge of the strength of the included components. In principle, however, the design of such a pattern can be done by any skilled artisan, and a large number of useful patterns, providing the properties which are required of a load-bearing structure for the application in question, are conceivable.

When the pieces of core material have been placed in the above-mentioned pattern, the heated, second surface material 3 is placed on top of the pieces of core material in order to thereby provide a complete, preheated material batch 9.

Thereafter, the preheated material batch 9 is placed in a moulding tool, according to compression moulding techniques previously known per se, with its mould parts 10, 11 in an open position.

In the described embodiment, the mould parts 10, 11 of the moulding tool are "cold" which means that, by means of cooling coils (mot shown in FIG. 3) within the walls of the mould parts, they are maintained at a constant temperature which is considerably lower than the temperature of the preheated material batch 9. In the described embodiment, the temperature of the mould parts 10, 11 is about 115° C.

After the material batch has been placed in the cooled moulding tool, the mould parts 10', 11' are pressed together around the material batch in order to effect moulding, consolidation and cooling of the material batch 9' enclosed inside the moulding tool. In the described embodiment, the moulding is done in about a minute and the applied moulding pressure is around 15 bar.

However, embodiments of the invention with compression moulding times between 30 and 90 seconds, and applied moulding pressures between 10 and 20 bar, are also conceivable.

When the compression moulding has finished, the mould parts 10", 11" are opened and a blank 12 for a load-bearing vehicle structure according to the invention is removed from the moulding tool.

Before a finished load-bearing structure according to the invention can be obtained, the edge portions 13, 14 of the blank 12 have to be trimmed, and possible burrs and the like have to be removed. In certain cases, holes for possible attachment points and the like have to be made. After such finishing, a load-bearing vehicle structure 1 according to the invention, which is ready to be mounted in a motor vehicle, is obtained.

The present invention should by no means be regarded as being limited to what has been described in connection with the preferred embodiments, or to what is shown in the attached drawings, but the scope of the invention is defined in the appended claims.

What is claimed is:

1. A compression-molded, load-bearing vehicle structure of composite material, comprising first and second surface materials comprising thermoplastic material in addition to reinforcement fibers, and one or several intermediate pieces of core material in the form of distinct, stiffening beam elements arranged in a pattern adapted to a load-bearing material structure, wherein the first surface material is attached by means of thermal bonds to first faces of the piece or pieces of core material and the second surface material is attached by means of thermal bonds to second, opposing faces of said piece or pieces of core material wherein the core material comprises structural foam and/or hollow bodies of thermoplastic material.

2. A compression-molded, load-bearing vehicle structure of composite material according to claim 1, wherein the first and/or the second surface material comprises a textile material of hybrid yarn with reinforcement fibres and a thermoplastic material in the form of matrix fibres.

3. A compression-molded, load-bearing vehicle structure of composite material according to claim 1, wherein the reinforcement fibres comprise glass fibres and wherein the thermoplastic material comprises polypropylene and/or polyester.

4. A compression-molded, load-bearing vehicle structure of composite material according to claim 1, wherein the core material comprises a structural foam.

5. A compression-molded, load-bearing vehicle structure of composite material according to claim 1, wherein the core material comprises a polyimide foam or a polyurethane foam.

6. A compression-molded, load-bearing vehicle structure of composite material according to claim 1, wherein one or several blow-molded hollow bodies of thermoplastic material are incorporated as one or several pieces of core material between the first and second surface materials.

7. A compression-molded, load-bearing vehicle structure of composite material according to claim 1, wherein one or several blow-molded hollow bodies of thermoplastic material provide(s) through-channels in the load-bearing vehicle structure, and wherein said through-channels are intended for ventilation, heating, tubing or laying of electrical wires.

8. A compression-molded, load-bearing vehicle structure of composite material according to claim 1, wherein the load-bearing vehicle structure is designed as a floor section intended for a motor vehicle.

9. A method for molding a compression-molded load-bearing vehicle structure of composite material, comprising preforming and arranging first and second surface materials and one or several pieces of core material in the form of distinct, stiffening beam elements are arranged in a pattern which is adapted for a load-bearing material structure in order to provide a material batch, and molding said material batch using a molding tool, wherein the material batch comprises thermoplastic material which is heated to a temperature above the softening temperature, and the heated material batch is placed between mold parts of said molding tool in an open position, whereafter the mold parts are pressed together around the material batch in order to effect molding and cooling of said material batch to a temperature below said softening temperature, and the mold parts thereafter are opened and a blank is removed from the molding tool in order to, after trimming and/or making of holes, provide a compression-molded, load-bearing vehicle structure, wherein the core material comprises structural foam and/or hollow bodies of thermoplastic material.

10. A-method for molding a compression-molded, load-bearing vehicle structure of composite material according to claim 9, wherein the thermoplastic material included in the material batch before molding is heated to a temperature which exceeds the melting temperature of said thermoplastic material by between 20 and 40° C.

11. A method for molding a compression-molded, load-bearing vehicle structure of composite material according to claim 9 or 10, the time during the molding which the mold parts are pressed together around the enclosed material batch is between 30 and 90 seconds, while the applied molding pressure is between 10 and 20 bar.

12. A method for molding a compression-molded, load-bearing vehicle structure of composite material according to any one of claims 9 to 11, wherein one or several pieces of core material are provided in the form of one or several blow-molded hollow bodies of thermoplastic material.

\* \* \* \* \*